(12) United States Patent
Khoury et al.

(10) Patent No.: US 11,198,326 B2
(45) Date of Patent: Dec. 14, 2021

(54) AXLE SYSTEM

(71) Applicant: SAF-HOLLAND GmbH, Bessenbach (DE)

(72) Inventors: Jean Khoury, Dreieich (DE); Christopher Nagel, Großostheim (DE)

(73) Assignee: SAF-HOLLAND, GmbH, Bessenbach (DE)

( * ) Notice: Subject to any disclaimer, the term of this patent is extended or adjusted under 35 U.S.C. 154(b) by 74 days.

(21) Appl. No.: 16/078,439

(22) PCT Filed: Feb. 21, 2017

(86) PCT No.: PCT/EP2017/053903
§ 371 (c)(1),
(2) Date: Aug. 21, 2018

(87) PCT Pub. No.: WO2017/144448
PCT Pub. Date: Aug. 31, 2017

(65) Prior Publication Data
US 2019/0054766 A1 Feb. 21, 2019

(30) Foreign Application Priority Data
Feb. 25, 2016 (DE) ..................... 10 2016 103 306.5

(51) Int. Cl.
*B60B 35/00* (2006.01)
*B60B 35/04* (2006.01)
(Continued)

(52) U.S. Cl.
CPC .......... *B60B 35/004* (2013.01); *B60B 35/006* (2013.01); *B60B 35/02* (2013.01);
(Continued)

(58) Field of Classification Search
CPC .................. B60G 35/007; B60G 9/003; B60G 2204/148; B60G 35/004; B60G 35/04;
(Continued)

(56) References Cited

U.S. PATENT DOCUMENTS 2,772,891 A * 12/1956 Bonnin .................. B60G 5/047
280/124.175
3,386,724 A * 6/1968 Chieger ................ B60G 11/113
267/52
(Continued)

FOREIGN PATENT DOCUMENTS

| CN | 102046403 A | 5/2011 | |
| DE | 102007006972 A1 * | 8/2008 | ............. B60G 7/008 |

(Continued)

OTHER PUBLICATIONS

Machine Translation of EP-0625440-A1 (Year: 1994).*
(Continued)

*Primary Examiner* — James A English
*Assistant Examiner* — Kurtis Nielson
(74) *Attorney, Agent, or Firm* — Price Heneveld LLP (57) ABSTRACT

Axle system for use in utility vehicles includes a suspension arm and a clamping unit, wherein the clamping unit has a base element and a clamping element, wherein the base element is substantially arranged on a first side and the clamping element on the second side of the suspension arm lying opposite the first side, wherein the base element is configured to be secured to an axle element, and wherein a tensile element is configured to apply a tensile force between the clamping element and the base element, such that the suspension arm is held by force fit between the clamping element and the base element.

20 Claims, 5 Drawing Sheets

(51) Int. Cl.
  *B60B 35/02* (2006.01)
  *B60G 9/00* (2006.01)
  *B60G 7/00* (2006.01)
(52) U.S. Cl.
  CPC .............. *B60B 35/04* (2013.01); *B60G 7/008* (2013.01); *B60G 9/003* (2013.01); *B60B 2900/111* (2013.01); *B60B 2900/115* (2013.01); *B60B 2900/531* (2013.01); *B60G 2204/148* (2013.01); *B60Y 2200/14* (2013.01); *Y02T 10/86* (2013.01)
(58) Field of Classification Search
  CPC .... B60G 35/006; B60G 7/008; B60B 35/007; B60B 35/004; B60B 35/04; B60B 35/006; B60B 35/02
  See application file for complete search history.

(56) References Cited

U.S. PATENT DOCUMENTS

| | | | | |
|---|---|---|---|---|
| 3,434,707 | A * | 3/1969 | Raidel | B60G 11/465 267/31 |
| 6,082,750 | A * | 7/2000 | Merkler | B60G 9/00 267/260 |
| 9,079,467 | B2 * | 7/2015 | Westnedge | B60G 5/04 |
| 9,446,646 | B1 * | 9/2016 | Bloink | B60G 11/113 |
| 2005/0253351 | A1 * | 11/2005 | Pan | B60G 9/003 280/124.116 |
| 2009/0256328 | A1 * | 10/2009 | Dudding | B60G 11/113 280/124.175 |
| 2010/0044991 | A1 * | 2/2010 | Luna | B60G 11/113 280/124.175 |
| 2011/0204589 | A1 * | 8/2011 | Reiter | B60B 35/003 280/124.11 |
| 2014/0035250 | A1 * | 2/2014 | Dilworth | B60G 11/10 280/124.111 |
| 2014/0259626 | A1 * | 9/2014 | Dilworth | F16B 5/0258 29/525.02 |
| 2015/0014953 | A1 * | 1/2015 | Pierce | B60G 11/113 280/124.1 |
| 2015/0115565 | A1 * | 4/2015 | Kopplow | B60G 11/113 280/124.175 |

FOREIGN PATENT DOCUMENTS

| | | | |
|---|---|---|---|
| DE | 112008000607 T5 | 1/2010 | |
| DE | 102012004403 A1 * | 9/2013 | ............. B60G 9/003 |
| DE | 22015101308 | 6/2015 | |
| DE | 202015101308 U1 * | 6/2015 | ........... B60B 35/008 |
| EP | 0625440 A1 * | 11/1994 | ........... B60G 11/113 |
| EP | 1273464 A1 * | 1/2003 | ........... B60G 11/465 |
| EP | 2363302 | 9/2011 | |
| EP | 2821263 | 1/2015 | |
| EP | 2821263 A1 * | 1/2015 | ........... B60B 35/006 |

OTHER PUBLICATIONS

Machine Translation of EP-1273464-A1 (Year: 2003).*
European Patent Office; International Search Report; dated Aug. 10, 2017.

* cited by examiner

AXLE SYSTEM

BACKGROUND OF THE INVENTION

The present invention concerns an axle system for use in utility vehicles, and a method for production of an axle system.

Axle systems for utility vehicles are known from the prior art. In particular, it is known to fix longitudinal control arms of the suspension of a utility vehicle to an axle tube by means of one or more clamping elements. In the prior art, it has formerly proved suitable to use U-shaped tensile elements which are placed under tensile load via nuts engaging on the tensile elements, and in this way press holding elements against the suspension arm and the axle tube in order to secure the suspension arm to the axle tube. The disadvantage of the axle systems known from the prior art is that, firstly, the weight of the systems for fixing a longitudinal control arm to an axle tube is very high. Furthermore, a large number of components is required, each of which must be provided from different sides to the assembly of suspension arm and axle tube and brought into active connection with this assembly.

The object of the present invention is to provide an axle system which eliminates the disadvantages of the prior art and in particular allows a weight reduction and at the same time reduces the number of components to be handled by a fitter.

SUMMARY OF THE INVENTION

According to the invention, the axle system comprises a suspension arm and a clamping unit, wherein the clamping unit has a base element and a clamping element, wherein the base element is substantially arranged on a first side and the clamping element on the second side of the suspension arm lying opposite the first side, wherein the base element is or can be secured to an axle element, wherein a tensile element is provided which is designed to apply a tensile force between the clamping element and the base element, such that the suspension arm is held by force fit between the clamping element and the base element. The suspension arm is preferably the longitudinal control arm of the utility vehicle, and in particular preferably made of sprung steel. The suspension arm in the sense of the present invention may be a trailing arm with a preferably rectangular cross-section, wherein the suspension arm is advantageously made from rolled spring steel or from particularly elastically deformable cast material. Furthermore, a clamping unit is provided which is designed for securing the suspension arm relative to an axle element. The clamping unit is preferably formed in at least two pieces, wherein a base element and a clamping element are provided. In other words, the base element is an adapter element which firstly is or may be attached to the axle tube, and secondly has a contact face on which the suspension arm may be arranged and brought into engagement by force fit. The first side of the suspension arm, when in use on the utility vehicle, may preferably be the underside or the side of the suspension arm facing the axle element. Furthermore, a clamping element of the clamping unit is provided which is arranged on the second side of the suspension element opposite the first side, and from this side exerts a holding force on the suspension arm. The second side of the suspension arm is accordingly preferably the side facing away from the axle element. In order to force the clamping element against the suspension arm in the direction of the base element, a tensile element is provided which transmits an elastic pretension force onto the clamping element, and thereby forces or presses the clamping element against the suspension arm and against the base element. The tensile element is preferably a bolt with a screw head, or a bolt with a nut, which is designed to establish a corresponding longitudinal force or tensile force between the clamping element and the base element. The force-fit connection of the clamping unit to the suspension arm is preferably created by a combination of the elastic deformation and corresponding return force of the tensile element, and a bending deformation of the clamping element which results in a corresponding return force. It is understood here that in particular the clamping element, base element and tensile element are made from materials with as high an elastic deformation proportion as possible, so that in particular plastic deformation of these components may be prevented, and in particular the occurrence of creep avoided with a sufficiently high certainty. Advantageously, the clamping elements merely encase the suspension arm and not the axle element, whereby the size or length of the clamping elements can be kept particularly low. In this way, it is possible to reduce significantly the weight of the clamping unit and hence the total weight of the axle system.

In a preferred embodiment, the clamping element has a first supporting portion and a second supporting portion, wherein the first supporting portion may be brought to rest on the second side of the suspension arm, and wherein the second supporting portion may be brought to rest on a holding face of the base element, wherein the tensile element may be brought into engagement on the clamping element substantially between the first and second supporting portions. Advantageously, the clamping element has two supporting portions which are each preferably formed as contact faces for resting on the suspension arm and on the base element. The supporting portions are advantageously spaced apart from each other, wherein preferably the region of force transmission from the tensile element to the clamping element is arranged between the supporting portions. In this way, in the physical sense, the clamping element is preferably regarded as a bending bar which receives forces in a first direction at two supporting points spaced apart from each other and is loaded with a force acting in the opposite direction to said two forces at a point between these two supporting points. The resulting bending of the clamping element creates an elastic return force which in turn transmits the corresponding holding force in the first supporting portion to the suspension arm. In comparison with elements known from the prior art for applying a clamping force between the suspension arm and axle tube, or between the suspension arm and the base element arranged in between, the arrangement preferably provided here is configured particularly compactly, since in particular the clamping elements have only a very slight extension and in particular do not surround the axle tube. In the context of the present invention, the fact that the tensile element may be brought into engagement with the clamping element by form fit and force fit substantially between the first and second supporting portion, means that the force transmission points of the first and second supporting portion, and the force transmission point between the tensile element and the clamping element, lie in a common line or plane, wherein the supporting portions are arranged on the outside. Preferably, the supporting portions, together with the force transmission point between the tensile element and the clamping element, span a triangle, the large angle of which is preferably provided in the region of the tensile element. In other words, the region of force transmission from the tensile element to the clamping element is arranged between the outlying supporting portions. The force transmission points in the present context are in particular central force transmission points, since in practice the force transmission regions are surfaces in which the surface center point can be regarded as the force transmission point. In particular, this arrangement is achieved when the axle system is viewed in the longitudinal direction of the suspension element and the section plane lying transversely thereto.

Furthermore preferably, in mounted state of the axle system, the first supporting portion has a mean distance from the longitudinal axis of the tensile element, wherein in mounted state of the axle system, the second supporting portion has a mean distance from the longitudinal axis of the tensile element, wherein the ratio between the mean distance of the first supporting portion and the mean distance of the second supporting portion lies between 0.8 and 1.4, preferably between 0.9 and 1.2, and particularly preferably around 1.1. The ratio of the mean distances of the supporting portions from the longitudinal axis of the tensile element is an expression of the lever arms in these regions between the first supporting portion and the second supporting portion. An adjustability in the design of the clamping element via this factor is particularly preferred for achieving a compromise between firstly a sufficiently large lever arm to achieve an adequately high degree of elastic bendability, in particular in order to be able to absorb impacts or periodic vibrations without damage to the material, and secondly a sufficiently high contact force of the clamping element on the suspension arm. In the context of the present invention, it has been found that the range of 0.8 to 1.4 for this ratio, for the great majority of arrangements in utility vehicles, allows adequate strength of the connection between the axle element and the suspension arm. In the ratio range from 0.9 to 1.2, in particular clamping elements of cast material may be used. With a ratio range which lies around 1 to 1.1, in particular an even distribution of load over the first and second supporting portions results, wherein preferably a slightly higher contact force acts on the second supporting portion, and a slightly greater elastic extension or elastic bending of the clamping element is possible at the first supporting portion, in order to be able to compensate better for vibrations occurring in operation of the utility vehicle.

Preferably, the base element has an axle-side engagement region which is configured for substance-bonded fixing of the base element to the axle element. Particularly preferably, the base element is secured to the axle element by substance bonding. For this, the base element preferably has an axle-side engagement region which is optimized in particular for production of a weld connection. For this, the axle-side engagement region is advantageously provided with edges which point towards the axle element and are chamfered so as to allow a particularly simple introduction and even distribution of welding material between the base element and the axle element on production of a thermal weld connection.

Particularly preferably, the axle-side engagement region is configured as a welding window, wherein a peripheral weld seam may be produced between the base element and the axle element. It has been found that a substance-bonded connecting region, configured as a peripheral weld seam, between the base element and the axle tube achieves particularly high values for strength and fatigue strength. Particularly preferably, the axle-side engagement region or also a plurality of axle-side engagement regions is arranged on the top side of the axle element, i.e. preferably on the compression half of the axle element which is compression-loaded on bending of the axle element. In this way, the service life of the connection between the base element and axle element can be increased, since less shear stress occurs in the connecting region or in the region of the weld seam.

Furthermore preferably, the base element has two axle-side engagement regions which are separate and spaced apart from each other, wherein the base element is or can be fixed to the axle element exclusively in the axle-side engagement regions. The base element preferably has two axle-side engagement regions which are formed as welding windows and in particular are not connected to each other. Thus two independent weld seams are formed between the base element and the axle element. In particular, this prevents stress concentrations on linear or blunt-ended weld seams, and thus allows a particularly firm connection between the base element and the axle element. In addition, the weld seams which are not connected to each other can each guarantee the strength of the connection between the axle element and the base element, even in the case that one of the weld seams fails. Fixing the base element exclusively in the axle-side engagement regions has the advantage that, firstly, the production cost is kept low and, secondly, a deterioration over large areas of the connecting regions between the base element and axle element due to welding of material can be avoided.

Furthermore preferably, the tensile element has an external thread which can be brought into form-fit and force-fit engagement with a threaded portion, wherein the threaded portion is provided on the base element or on the clamping element and/or on a nut provided separately. In other words, the tensile element is preferably formed as a screw bolt, wherein a screw element with or without head may be used, depending on the possible fixings to the base element, clamping element or nut. The threaded portion may preferably be provided on the base element or on the clamping element, or alternatively or additionally in a nut which is used to lock the tensile element in the mounted state. Preferably, the external thread of the tensile element extends only over the region which comes into engagement with the respective opposite element, i.e. base element or clamping element or nut, wherein the remainder of the tensile element is formed without a thread in order in particular to allow pure tensile elongation with minimal notch effects outside the threaded area.

In a particularly preferred embodiment, the threaded portion is provided in a bore of the base element. This embodiment is distinguished by a particularly compact formation of the axle system, in particular since no additional nut is required and merely the tensile element with its external thread can be screwed into a bore on the base element equipped with an internal thread. The compact construction may here outweigh the advantage of an additionally arranged nut, which may be made of a higher-strength material and in particular can easily be exchanged, in the case where installation space for the axle system on the utility vehicle is limited.

In an alternative embodiment, the tensile element may be formed integrally with the base element or is fixed to the base element by substance bonding and/or by form fit, wherein the threaded portion is provided on a nut provided separately which can be brought into engagement on the clamping element. A compact formation of the axle system is possible if the tensile element is configured integrally with the base element, or is brought into engagement with the base element by substance bonding and/or form fit before the clamping element is mounted on the base element. The advantage of this embodiment is that the tensile element can be preassembled together with the base element and, for mounting the axle system, the nut simply fixed to the tensile element, and thus only few components need be handled by a fitter.

In a preferred embodiment, the axle system has two clamping elements which are arranged opposite each other relative to the suspension arm and can be fixed to the base element by means of a respective tensile element. Advantageously, the suspension arm is thus loaded with a force by a clamping element on each of two sides, for example on the right and left of the suspension arm viewed in the longitudinal direction of the suspension arm, forcing the suspension arm against the base element. In this way, a greater strength of the connection of the suspension arm to the base element and hence to the axle element can be achieved.

Preferably, the clamping elements are formed as separate components and are substantially identical. A substantially identical form means that the first and the second supporting portion, and the bore or thread for engagement of the tensile element, are configured identically, while further material regions adjacent to these portions may have quite different dimensions in order for example to achieve a higher contact pressure on one side of the suspension arm than on the other. The advantage of identical formation of the clamping elements is that these are interchangeable, and in particular the production of suspension elements may be simplified since a single clamping element form may be used for different applications of axle systems. Thus the various, identically formed clamping elements may be brought into engagement for example with differently formed base elements, in order to secure suspension elements of different widths or heights on axle elements.

Furthermore preferably, the clamping elements are connected together via a spring portion, wherein the spring portion is formed with a thin wall compared to the clamping elements. The spring portion serves in particular to simplify the handling of the clamping elements for a fitter, since two clamping elements can be arranged on the axle system at the same time in one action. In order not to overly obstruct an elastic deformation of the clamping elements on clamping to the suspension arm, the spring portion is preferably formed with a particularly thin wall and hence is elastically deformable. A thin wall means in particular a wall thickness of the spring portion from 0.01 to 0.1 times the wall thickness of the clamping element in the region of the force transmission from the clamping element to the suspension arm. Particularly preferably, the spring portion may be made of a spring steel sheet, around which the material of the clamping element is cast. Furthermore, preferably, the spring portion may itself have a contact face with the suspension arm and in particular achieve a further contact pressure of the suspension arm on the base element.

In a particularly preferred embodiment, four clamping elements are or can be fixed to the base element by means of a respective tensile element. With this preferred embodiment, the suspension element is thus brought into force-fit connection with the base element at four fixing points. Preferably, the clamping elements are here formed substantially identically, leading to an interchangeability of the clamping elements in relation to their installation position of the base element and also in relation to suspension arms of different sizes.

Advantageously, a bore, through which the tensile element extends, is provided on the clamping element, wherein the bore is preferably configured as a slot, and wherein the longer chord of the slot has a chord length which is 1.1 to 1.6 times, preferably 1.1 to 1.3 times, and particularly preferably around 1.2 times the outer diameter of the tensile element in the region of the bore. The design of the bore on the clamping element as a slot in particular allows pivoting of the region of the clamping element in which the bore is arranged relative to the tensile element. In this way, on clamping with the resulting elastic deformation of the clamping element, in particular in the region of engagement of the tensile element, a certain pivoting of the clamping element relative to the tensile element may take place without this leading to a skewing of the bore of the clamping element with the tensile element. As an alternative to a substantially cylindrical or linear slot, the clamping element could also have a bore with a cross-section which initially decreases and then increases again beyond a narrowest point towards the base element. This bore has the advantage that the material of the clamping element is weakened less. The advantage of the straight slot, however, is that it is easier to produce. In order to simplify the pivotability of the clamping element relative to the tensile element, the contact faces of the tensile element and clamping element are preferably curved, which allows pivoting of the clamping element relative to the tensile element without a skewing or notch effect occurring in the region of force transmission from the tensile element to the clamping element.

Furthermore, preferably, the base element has a holding geometry which in mounted state comes into form-fit engagement with the suspension arm and prevents a shift of the suspension arm relative to the clamping unit along the longitudinal axis of the suspension arm. Advantageously, in the engagement region on the suspension arm side, the base element has a protrusion or rebate which comes into engagement with a corresponding protrusion or rebate on the suspension arm, in order to secure the suspension arm against displacement relative to the clamping unit. In particular along the axis in which a shift of the suspension arm relative to the clamping unit is not hindered by the force-fit and form-fit engagement of the clamping element and base element, preferably the connection between the suspension element and axle element is secured additionally by a form fit. For this, the base element preferably has a holding geometry which for example may be configured as a simple spike which digs into the material of the suspension element in regions, and in this way creates a form fit between the base element and the suspension arm. Furthermore, preferably, a local depression may be provided on the suspension arm, with which a corresponding protrusion provided on the base element comes into engagement in order to create a form fit between the suspension arm and the base element, at least in one direction.

Furthermore, preferably, a fixing portion is formed integrally with the base element for fixing further components of the suspension of a utility vehicle. In other words, the base element advantageously has a flange portion which for example has a bore for securing a shock absorber by means of a bolt element.

According to the invention, a method is provided for production of axle system which comprises the steps: provision of a suspension arm, a clamping unit and an axle element; connection of a base element of the clamping unit to the axle element; placing of the suspension arm on the base element; provision of a clamping element of the clamping unit, and clamping of the clamping element against the suspension arm by means of a tensile element which is in engagement with the base element. The method for production of an axle system is preferably an assembly sequence, wherein in a preferred embodiment of the method, the individual method steps take place in precisely the order cited above. Here, initially only three basic components need be provided for production of the axle system: a suspension arm, a clamping unit and an axle element. Then preferably the base element of the clamping unit is welded to the axle element. Preferably thereafter, the suspension arm is placed on the base element, preferably in or on the engagement portion of the base element on the suspension arm side. Thereupon, at least one clamping element of the clamping unit is provided and screwed or clamped against the base element by means of a tensile element, wherein at the same time the clamping element clamps the suspension arm against the base element and thus creates a force fit between the clamping unit and the suspension arm. With the method according to the invention, an axle system can be produced in which a suspension arm is fixed relative to an axle element via a clamping unit. It is understood that individual objective features of the axle system described above may also facilitate the method for production of the axle system, and hence in particular be applied to further preferred embodiments of the method.

Advantageously, the base element is fixedly welded to the axle element. The production of a weld connection creates, in a simple fashion, a secure substance bonding between the base element and the axle element, wherein then a force-fit and form-fit connection of the suspension arm to the base element, and hence indirectly also to the axle element, may be produced by bolting one or more clamping elements to the base element.

BRIEF DESCRIPTION OF THE DRAWINGS

Further advantages and features of the present invention arise from the description below with reference to the attached figures. It is understood that individual features disclosed in just one of the embodiments shown may also be used in other embodiments, unless explicitly excluded or prohibited for technical reasons. The drawings show.

DETAILED DESCRIPTION OF THE PREFERRED EMBODIMENTS

Figure 1:
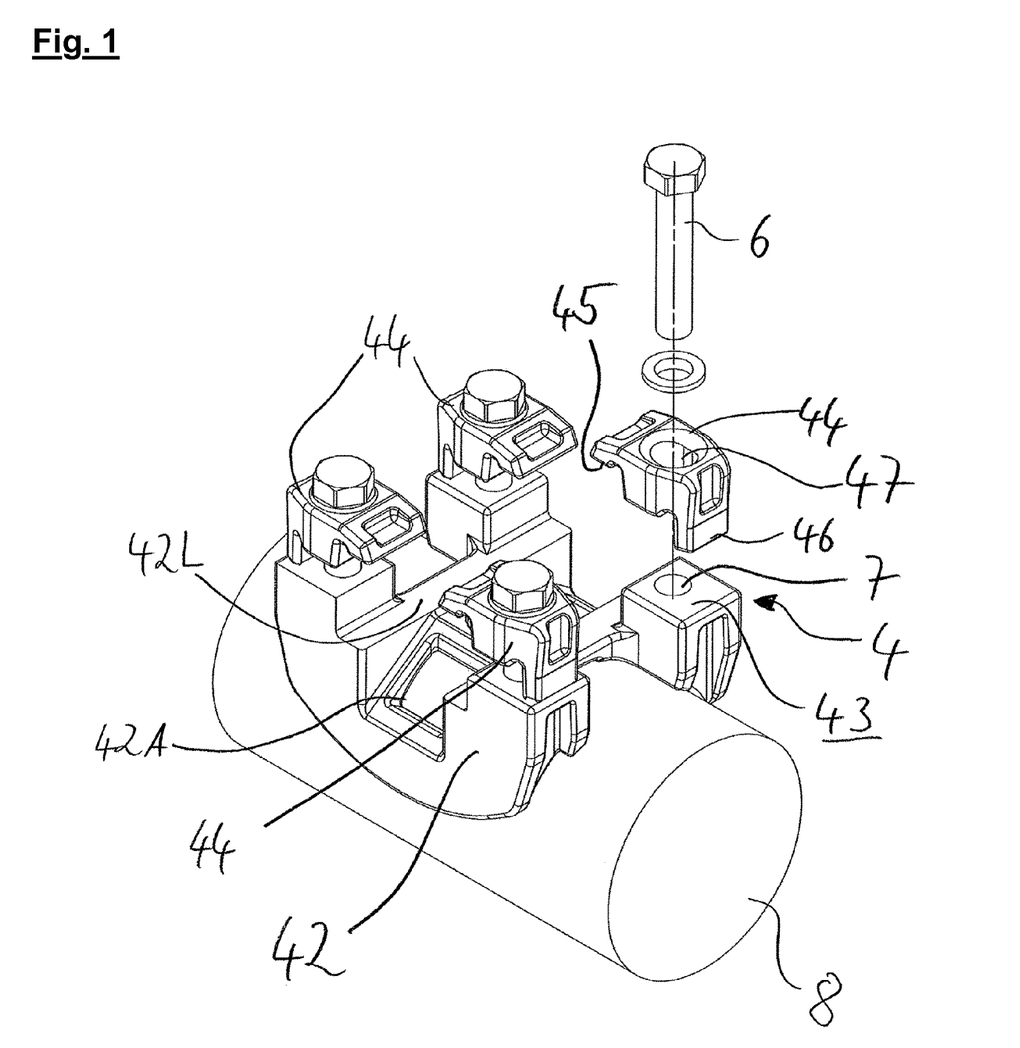
FIG. 1 a perspective view of a clamping unit of the axle system according to the invention.

FIG. 1 shows a clamping unit 4 in which a base element 42 of the clamping unit 4 is fixed to the axle element 8. Particularly preferably, the base element 42 is welded to the axle element 8 in the region of the axle-side engagement regions 42A. Furthermore, preferably, four clamping elements 44 are arranged on the base element 42, each of which is fixed to the base element 42 by form fit and force fit via a respective tensile element 6. FIG. 1 does not show the suspension arm 2 (see for example FIG. 2) which may be arranged between the clamping elements 44 and the engagement region 42L of the base element 42 on the suspension arm side, and in this position can be secured by force fit to the clamping unit 4 and hence indirectly to the axle element 8. The clamping elements 44 have a bore 47, preferably formed as a slot, through which the tensile element 6 extends with its cylindrical shaft in order to come into engagement with a threaded portion 7 (not shown in detail) of the base element 42, and in this way force the clamping element 44 against the base element 42. Each of the clamping elements 44 here has a first supporting portion 45 and a second supporting portion 46, wherein the first supporting portion 45 comes into engagement with the suspension arm (not shown), and the second supporting portion 46 comes into supporting engagement on the holding face 43 of the base element 42. Advantageously, the base element 42 is formed as an integral casting, i.e. as many of its geometries as possible can be produced by casting in a single process step. Advantageously, the individual clamping elements 44 are also produced by casting processes, wherein advantageously a particularly elastically deformable material, such as ductile cast iron or spring steel cast iron specially produced for this purpose, is used for production of the clamping elements 44.

Figure 2:
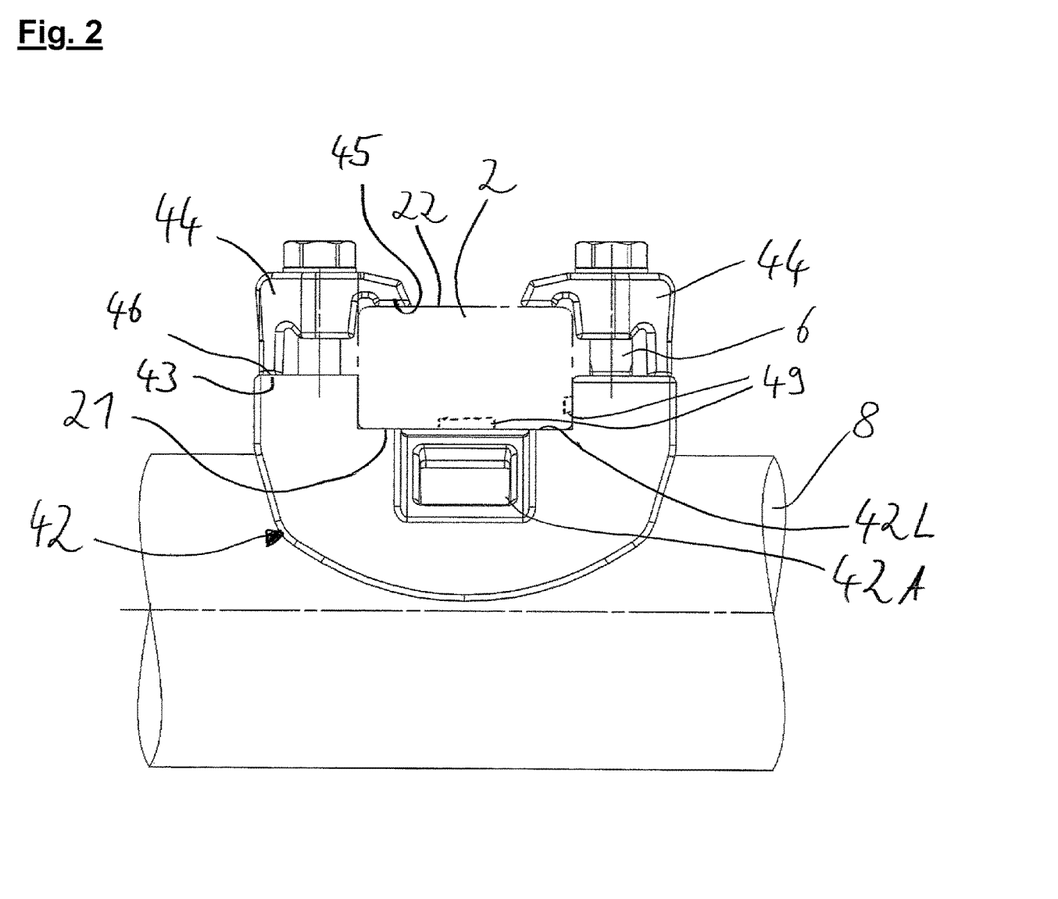
FIG. 2 a side view of the axle system according to the invention in the longitudinal direction of the suspension arm.

FIG. 2 shows a view of a preferred embodiment of the axle system according to the invention, viewed in the direction of the longitudinal axis of the suspension arm 2. The suspension arm 2 advantageously has a rectangular cross-section at least in the region of fixing by the clamping unit 4. Furthermore, a first side 21 and a second side 22 are formed on the suspension arm 2. With its first side 21, the suspension arm 2 rests preferably on the engagement region 42L of the base element 42 on the suspension arm side. The figure furthermore shows that a holding geometry 49 is formed preferably in the region of the engagement region 42L of the base unit on the suspension arm side, wherein two possible positions for such a holding geometry 49 are shown. The holding geometry 49 serves to prevent slippage of the suspension arm 2 relative to the clamping unit 4 in the direction of observation, i.e. the longitudinal direction of the suspension element 2. Preferably, the clamping unit 4 has two clamping elements 44 which lie opposite each other relative to the suspension element 2 and which are clamped by a tensile element 6 against the base element 42 and the second side 22 of the suspension element 2 respectively. Furthermore, the axle-side engagement region 42A of the base element 42 is shown, which is preferably formed as a rectangle with rounded corners, and in which a weld connection can be created between the base element 42 and the axle element 8. The axle element 8 preferably extends along an axis of symmetry which runs orthogonally to the longitudinal axis of the suspension arm 2 in the region in which the suspension arm 2 is secured to the axle element 8 by the clamping unit 4.

Figure 3:
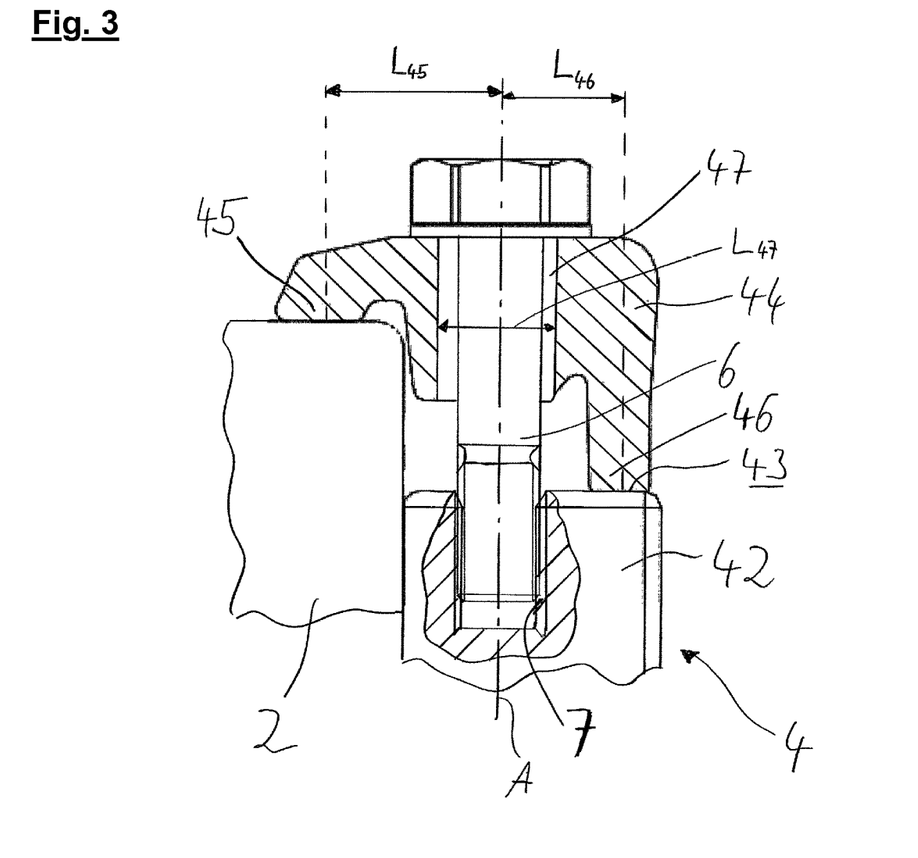
FIG. 3 a partially cut-away, detail view of the embodiment shown in FIG. 2.

FIG. 3 shows a partially cut-away, detail view of the axle system already shown in FIG. 2. The figure shows in particular further details of the region of the clamping element 44 and its engagement on the suspension element 2 and base element 42, and details of the tensile element 6. Preferably, the clamping element 44 has a bore 47 formed as a slot, wherein the extension or the linear chord $L_{47}$ of the bore 47 is greater than the diameter of the tensile element 6 in the region of the passage of the tensile element 6 through the bore 47. In this way, a degree of shifting or pivoting of the tensile element 6 relative to the clamping element 44 may take place inside the bore 47. The figure furthermore shows that, preferably, the tensile element 6 has an external thread only in the region of its engagement with the threaded portion 7, and is otherwise formed as a tension bolt which has a substantially cylindrical outer geometry. Advantageously, in this way, on elongation of the tensile element 6, a stress concentration in the outer region of the tensile element 6 can be minimized. Furthermore, the figure shows the mean distance $L_{45}$ of the first supporting portion 45 from the longitudinal axis A of the tensile element 6, and the mean distance $L_{46}$ of the second supporting portion 46 from the longitudinal axis A of the tensile element 6. The two mean distances $L_{45}$ and $L_{46}$ preferably have a ratio to each other of 0.8 to 1.4. In the preferred embodiment shown in FIG. 3, the mean distance $L_{45}$ of the first supporting portion 45 is slightly larger than the mean distance $L_{46}$ of the second supporting portion, wherein the size ratio is around 1.1 to 1.2. In this way, a greater force can be transmitted to the base element 42 in the region of the second supporting portion 46 than can be transmitted to the suspension arm 2 in the first supporting portion 45.

Figure 4:
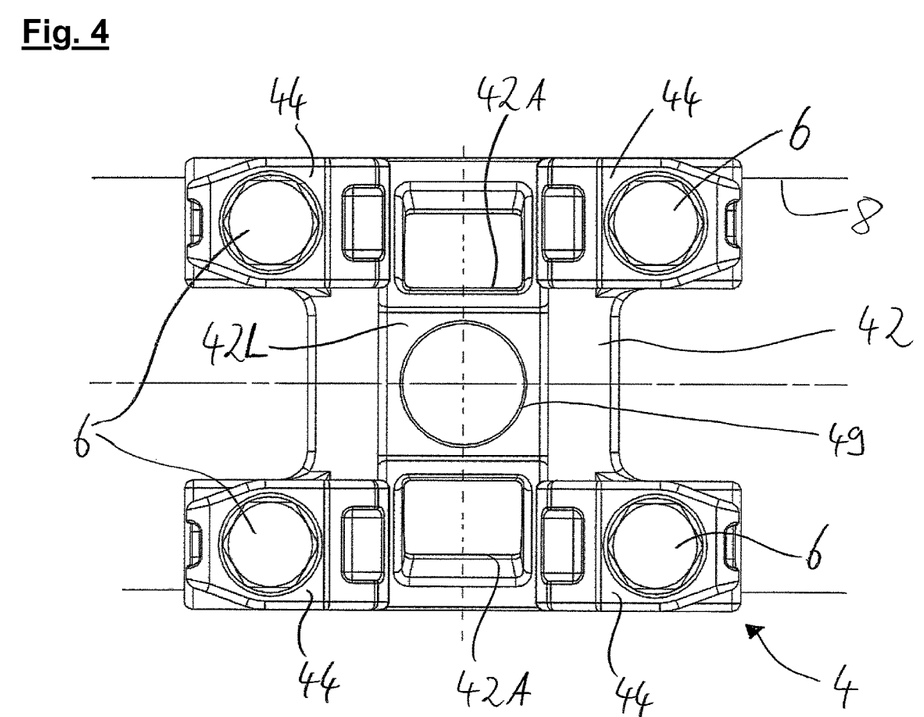
FIG. 4 a top view of the axle system already shown in FIG. 1.

FIG. 4 shows a top view of a preferred embodiment of the axle system, wherein the suspension arm 2 is not shown for reasons of visibility of the other geometries. In particular, it can be seen that the base element 42 preferably has two axle-side engagement regions 42A which can each be welded to the axle element 8 independently and spaced apart from each other. Furthermore, it is shown that the clamping elements 44 are preferably configured substantially identically, and thus a single type of clamping element 44 may be used for a multiplicity of applications. Furthermore, preferably, the cross-section of the base element 42 is formed as a double T-shape, wherein in particular the material of the base element 42 is saved at the regions in which no connection is created to the axle element 8 or clamping elements 44, in order to reduce the weight. At its engagement region 42L on the suspension arm side, the base element 42 has a holding geometry 49 which in the present case is formed as a disk-like or circular rebate. Either the suspension arm 2 with a corresponding protrusion can engage in this rebate, or an additional component with the function of a tongue-and-groove connection may be arranged between the suspension arm 2 and the base element 42.

Figure 5:
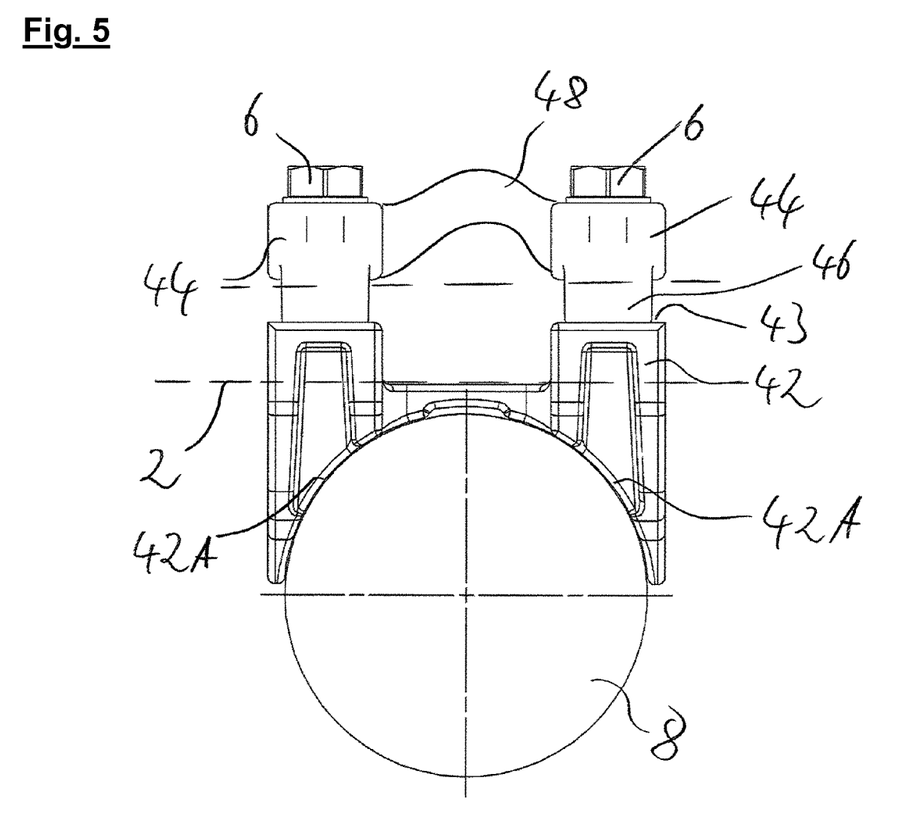
FIG. 5 a view of an embodiment of the axle system according to the invention along the tube axis of the axle element.

FIG. 5 shows a preferred embodiment of the axle system according to the invention, wherein the viewing plane in the present case lies perpendicular to the longitudinal extension of the axle element 8. Preferably, two clamping elements 44 are connected together via a spring portion 48. FIG. 5 shows a first embodiment of the spring portion 48 which connects together two clamping elements 44 which are adjacent to each other in the longitudinal direction of the suspension arm 2. As an alternative to the embodiment shown in FIG. 5, two clamping elements 44 lying opposite each other relative to the longitudinal axis of the suspension arm 2 may be connected together via a spring portion 48. It is preferred that the axle-side engagement region 42A of the base element 42 is formed so as to be curved or rounded corresponding to the outer geometry of the axle element 8, since in this way the area of contact with the axle element 8 is as large as possible. The holding face 43 of the base element 2 and the corresponding face of the second supporting portion 46 are preferably formed so as to be flat or planar, wherein a particularly large contact area between the second supporting portion 46 and the holding face 43 in particular can avoid local Hertzian stress, and particularly high compression forces or supporting forces can be transmitted from the clamping element 44 to the base element 42.

LIST OF REFERENCE SIGNS

2—Suspension arm
21—First side
22—Second side
4—Clamping unit
42—Base element
42A—Axle-side engagement region
42L—Engagement region on suspension arm side
43—Holding face
44—Clamping element
45—First supporting portion
46—Second supporting portion
47—Bore
48—Spring portion
49—Holding geometry
6—Tensile element
7—Threaded portion
8—Axle tube
A—Longitudinal axis of tensile element
$L_{45}$—Mean distance of first supporting portion
$L_{46}$—Mean distance of second supporting portion
$L_{47}$—Large chord length of bore

The invention claimed is:

1. An axle system for use in utility vehicles, comprising:
a suspension arm; and
a clamping unit;
wherein the clamping unit has a base element and a clamping element;
wherein the base element is at least partially arranged on a first side and the clamping element on a second side of the suspension arm lying opposite the first side;
wherein the base element is configured to be secured to an axle element; and
wherein a tensile element is provided which is configured to apply a tensile force between the clamping element and the base element, such that the suspension arm is held by force fit between the clamping element and the base element;
wherein the clamping element abuts the second side of the suspension arm and a holding surface of the base element, where the holding surface and the second side of the suspension arm face in the same direction;
wherein the clamping element has a first supporting portion and a second supporting portion;
wherein the first supporting portion abuts the second side of the suspension arm;
wherein the second supporting portion abuts the holding surface of the base element; and
wherein the tensile element is configured to be brought into engagement on the clamping element at least partially between the first and second supporting portions, where the first and second supporting portions are horizontally spaced from one another by a gap and the tensile element is at least partially located within the gap.

2. The axle system as claimed in claim 1,
wherein in a mounted state of the axle system, the first supporting portion has a mean distance from a longitudinal axis of the tensile element;
wherein in the mounted state of the axle system, the second supporting portion has a distance from the longitudinal axis of the tensile element; and
wherein the ratio between the mean distance of the first supporting portion and the mean distance of the second supporting portion is between 0.8 and 1.4.

3. The axle system as claimed in claim 2, wherein the ratio is between 0.9 and 1.2.

4. The axle system as claimed in claim 3, wherein the ratio is about 1.1.

5. The axle system as claimed in claim 1, wherein the base element has an axle-side engagement region which is configured for substance-bonded fixing of the base element to the axle element.

6. The axle system as claimed in claim 5, wherein the axle-side engagement region is configured as a welding window.

7. The axle system as claimed in claim 5,
wherein the base element has two axle-side engagement regions which are separate and spaced apart from each other; and
wherein the base element is configured to be fixed to the axle element in the axle-side engagement regions only.

8. The axle system as claimed in claim 1,
wherein the tensile element has an external thread which is configured to be brought into form-fit and force-fit engagement with a threaded portion; and
wherein the threaded portion is provided on the base element or on the clamping element and/or on a separate nut.

9. The axle system as claimed in claim 8,
wherein the tensile element is integral with the base element or is fixed to the base element by substance bonding and/or by form fit; and
wherein the threaded portion is provided on a separate nut which is configured to be brought into engagement on the clamping element.

10. The axle system as claimed in claim 1, wherein the clamping element is one of two clamping elements that are arranged opposite each other relative to the suspension arm and are configured to be fixed to the base element by respective tensile elements.

11. The axle system as claimed in claim 10,
wherein the clamping elements are connected together via a spring portion; and
wherein the spring portion includes a thin wall compared to the clamping elements.

12. The axle system as claimed in claim 1, wherein the clamping element is one of four clamping elements that are configured to be fixed to the base element by respective tensile elements.

13. The axle system as claimed in claim 1,
wherein a bore, through which the tensile element extends, is provided on the clamping element;
wherein the bore is configured as a slot; and
wherein a longer chord of the slot has a chord length which is 1.1 to 1.6 times an outer diameter of the tensile element in a region of the bore.

14. The axle system as claimed in claim 13, wherein the chord length is 1.1 to 1.3 times the outer diameter.

15. The axle system as claimed in claim 14, wherein the chord length is about 1.2 times the outer diameter.

16. The axle system as claimed in claim 1, wherein the base element has a holding geometry which in mounted state comes into form-fit engagement with the suspension arm and prevents a shift of the suspension arm relative to the clamping unit along a longitudinal axis of the suspension arm.

17. The axle system of claim 1, wherein the tensile element is entirely located within the gap.

18. An axle system for use in utility vehicles, comprising:
a suspension arm; and
a clamping unit;
wherein the clamping unit has a base element and a clamping element;
wherein the base element is at least partially arranged on a first side and the clamping element on a second side of the suspension arm lying opposite the first side;
wherein the base element is configured to be secured to an axle element; and
wherein a tensile element is provided which is configured to apply a tensile force between the clamping element and the base element, such that the suspension arm is held by force fit between the clamping element and the base element;
wherein the clamping element abuts the second side of the suspension arm and a holding surface of the base element, where the holding surface and the second side of the suspension arm face in the same direction;
wherein the clamping element has a first supporting portion and a second supporting portion;
wherein the first supporting portion abuts the second side of the suspension arm;
wherein the second supporting portion abuts the holding surface of the base element; and
wherein the tensile element is configured to be brought into engagement on the clamping element at least partially between the first and second supporting portions;
wherein the clamping element is one of two clamping elements that are arranged opposite each other relative to the suspension arm and are configured to be fixed to the base element by respective tensile elements; and
wherein the clamping elements are separate components and are substantially identical.

19. A method for production of an axle system, comprising:
providing a suspension arm having a first side and a second side opposite the first side;
providing a clamping unit; and
providing an axle element;
connecting a base element of the clamping unit to the axle element;
placing the suspension arm on the base element such that the first side of the suspension arm abuts a holding face of the base element; and
providing a clamping element of the clamping unit, wherein the clamping element includes a first supporting portion and a second supporting portion; and
clamping the clamping element against the suspension arm by a tensile element which is in engagement with the base element, such that the first supporting portion of the clamping element abuts the second side of the suspension arm and the second supporting portion abuts the holding surface of the base element, where the holding surface and the second side of the suspension arm face in the same direction, wherein the tensile element is brought into engagement on the clamping element at least partially between the first and second supporting portions, and wherein the first and second supporting portions do not overlap with one another along a vertical line.

20. The axle system of claim 19, wherein the tensile element is entirely located between the first and second supporting portions.

* * * * *